Dec. 9, 1941.  H. E. FULTZ  2,265,132
DIRECTION INDICATOR FOR MOTOR VEHICLES
Filed June 21, 1940  2 Sheets-Sheet 1

H. E. Fultz
INVENTOR.
BY
ATTORNEYS.

Dec. 9, 1941.  H. E. FULTZ  2,265,132
DIRECTION INDICATOR FOR MOTOR VEHICLES
Filed June 21, 1940   2 Sheets-Sheet 2
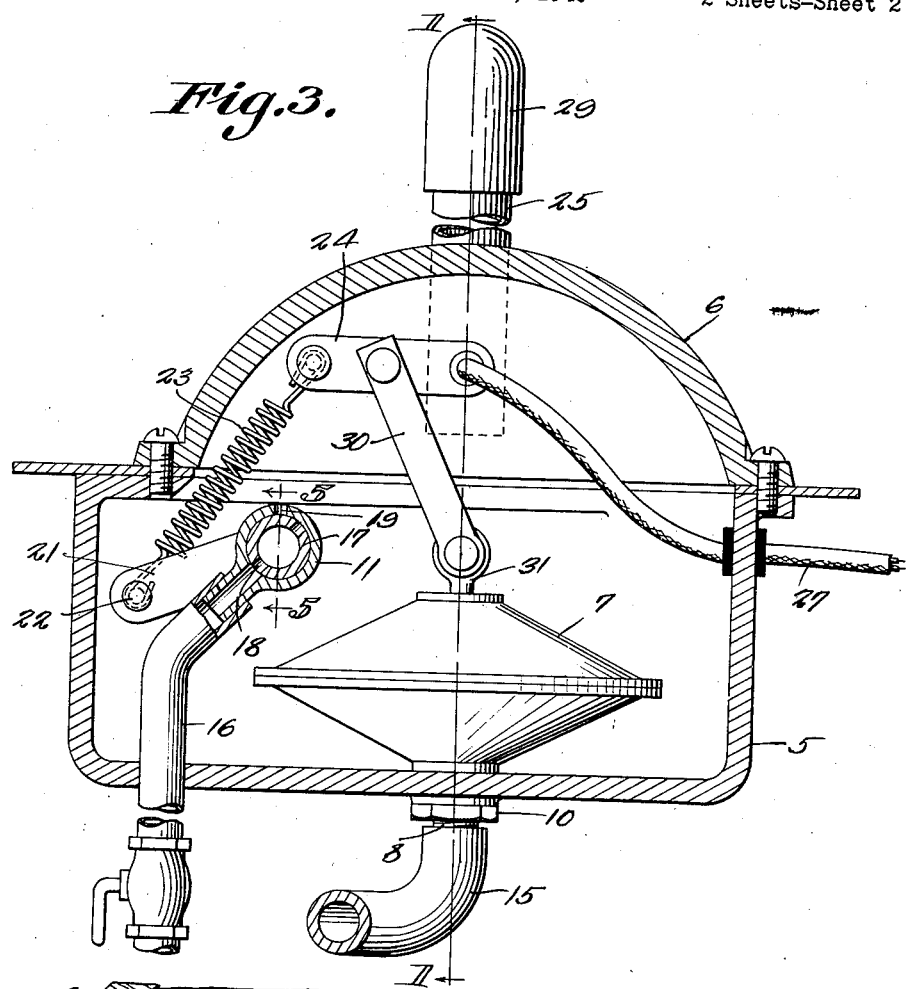
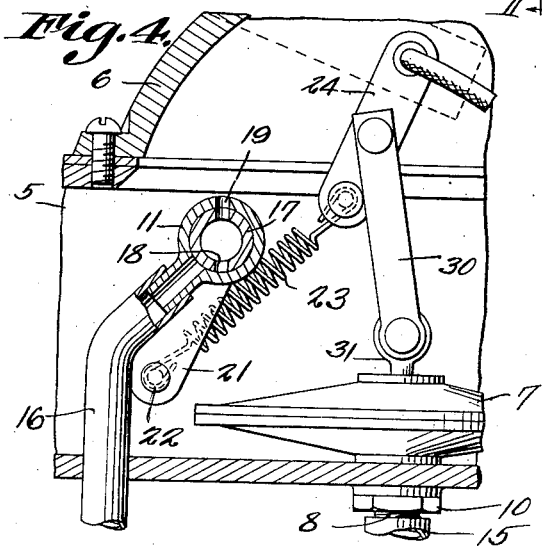
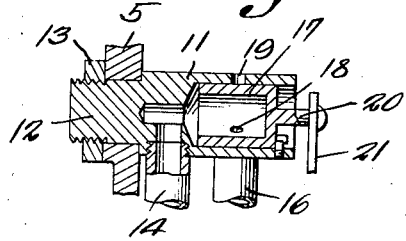
H. E. Fultz
INVENTOR.
BY
ATTORNEYS.

Patented Dec. 9, 1941

2,265,132

UNITED STATES PATENT OFFICE 2,265,132

DIRECTION INDICATOR FOR MOTOR VEHICLES

Howard Edwin Fultz, Hamilton, Ohio

Application June 21, 1940, Serial No. 341,762

1 Claim. (Cl. 116—39)

This invention relates to direction indicators, and more particularly to direction indicators for mounting on motor vehicles to indicate the direction of travel to be taken by the motor vehicle.

An important object of the invention is to provide a direction indicator of this character embodying a movable indicating arm, novel means being provided for operating the indicating arm whereby the indicating arm may be moved to various positions to indicate direction.

Another object of the invention is to provide a direction indicator of this character, wherein the operating mechanism for operating the direction indicating arm, will be controlled by a vacuum created in the intake manifold of the motor of the vehicle, the means for controlling the vacuum being thrown into and out of operation by the actuation of a valve controlled by the operator and disposed in proximity to the operator, so that he will have ready access thereto.

Still another important object of the invention is to provide a controlling means for the indicating arm which will cause the indicating arm to swing continuously, until the control valve has been moved to render the indicating arm inactive, thereby providing means for attracting the attention of the operators of vehicles moving in proximity to the indicating device.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 3 is a vertical sectional view taken on line 3—3 of Figure 1.

Figure 4 is an enlarged fragmental sectional view illustrating the position of the links and arms when the diaphragm has been collapsed by the vacuum created therein.

Figure 5 is a sectional view taken on line 5—5 of Figure 3.

Figure 1:
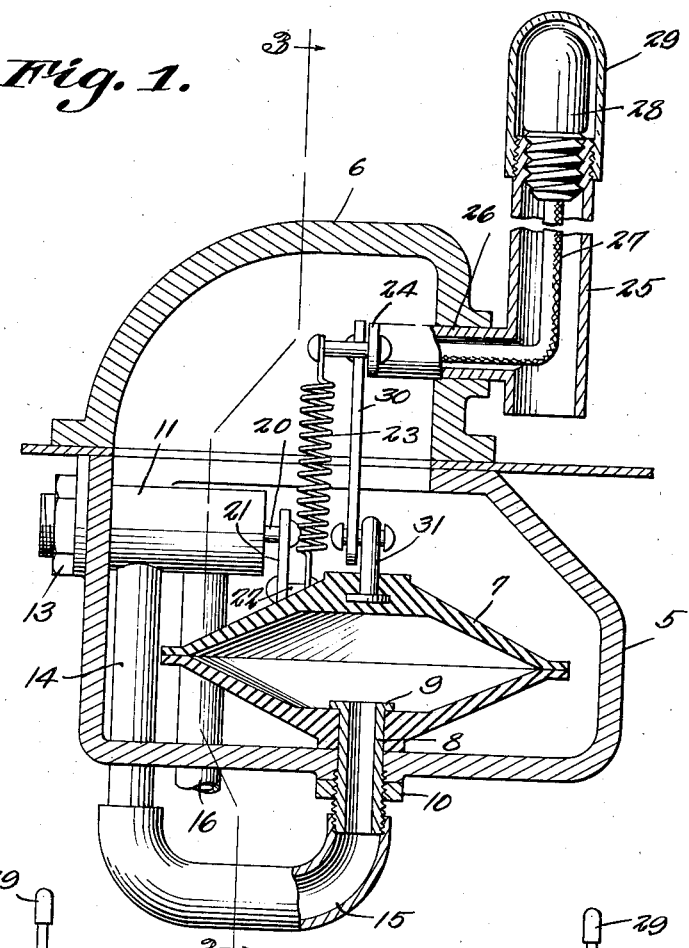
Figure 1 is a vertical sectional view taken on line 1—1 of Figure 3.
Figure 2:
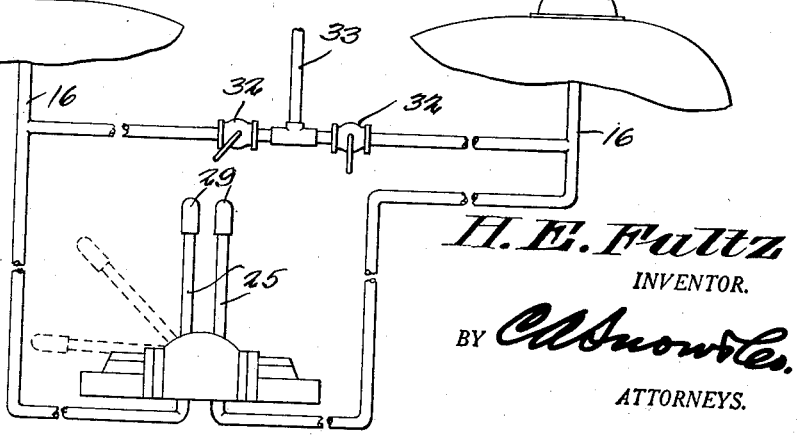
Figure 2 is a diagram illustrating the pipe system and indicating arms of the signal.

Referring to the drawings in detail, the direction indicator comprises a casing 5 having its top open, to be fitted under a fender, adjacent to an opening formed in the fender. The indicator also includes an upper section 6 formed with an opening, so that it may be positioned directly over the opening above the casing 5, as clearly shown by Figure 1 of the drawings.

Mounted within the casing 5, is a collapsible chamber 7 constructed preferably of rubber, the collapsible chamber 7 being secured in position by means of the pipe 8 which is shown as extending through an opening in the lower wall of the chamber 7, the pipe 8 having a flange 9 at its upper end engaging the lower wall of the collapsible chamber. The lower end of the pipe 8 is externally threaded to receive the nut 10, whereby the pipe may be securely held in position and at the same time will grip the collapsible chamber 7.

The reference character 11 designates a valve cylinder which is formed with an extension 12 positioned in an opening in the side wall of the casing 5, the extension being threaded to receive the nut 13, whereby the valve cylinder is secured in position. A pipe indicated at 14 extends into the valve cylinder 11, the pipe 14 being connected with the pipe 8, by means of the pipe 15. A pipe indicated at 16 also extends into the valve cylinder and establishes communication between the valve cylinder and the usual intake manifold of the motor of the vehicle with which the direction indicator is used.

A cylindrical valve indicated at 17 operates within the valve cylinder 11, the inner end of the valve 17 being open, as shown by Figure 5. An opening 18 is formed in the cylindrical valve 17 and is adapted to be moved to register with the pipe 16, as shown by Figure 3, or to register with the opening 19 in the valve cylinder 11 allowing air to enter the collapsible chamber 7 during one period of operation of the indicator.

The cylindrical valve 17 is provided with an extension 20 to which the arm 21 is connected to move therewith, the arm 21 being provided with a pin 22 to which the coiled spring 23 is connected, the opposite end of the coiled spring 23 being connected to one end of the arm 24. This arm 24 has connection with the indicator arm 25, through the extension 26 which is mounted in an opening formed in the upper section 6. The arm 25 and extension 26 are hollow, to accommodate an electric wire indicated at 27 that leads to the lamp 28 mounted within the upper end of the arm, the wire being also connected with a suitable source of electricity supply, to supply the lamp 28 with electric current to cause the same to be illuminated. A transparent casing 29 is removably mounted on the upper end of the arm 25, and protects the lamp 28.

Connected with the arm 24, is a link 30, the link being also connected with the pin 31 that is secured in the upper section of the collapsible chamber 7.

It will of course be understood that the connection between the arm 24 and extension 26 of the indicating arm 25, is such that movement of the arm 24 will cause a relative swinging movement of the indicator arm 25.

While I have described one of the indicators, it is to be understood that it is contemplated to use an indicator of this character on each front fender of the motor vehicle, and to mount another indicator at the rear of the motor vehicle, the indicator at the rear of the motor vehicle being a double armed type so that when the indicator arm at the right front end of the vehicle is placed in operation, the indicating arm at the right and at the rear of the vehicle will also be brought into operation. Of course the operation of the indicating arm at the rear of the vehicle on the left side thereof operates with the indicator at the front of the vehicle and to the left thereof.

Valves indicated by the reference character 32, are mounted in the pipe 33 that is in communication with the pipe 16 of the indicators, the pipe 33 being in communication with the intake manifold of the motor.

In the operation of the device, assuming that a vehicle equipped with the indicator described, is to make a left turn. The operator operates the valve 32 at the left of the pipe system, establishing communication between the intake manifold and collapsible chamber 7, through the pipes 14 and 16 and valve cylinder 11. When communication is established between the intake manifold and collapsible chamber, the valve 17 is in the position as shown by Figure 3. As suction is created within the collapsible chamber 7, the link 30 is drawn downwardly, whereupon the arm 24 swings downwardly, and when the arm moves past dead center, the action of the coiled spring 23 will swing the arm 21 and indicating arm 25 to the dotted line position shown by Figure 4. As the cylindrical valve 17 moves to the position shown by Figure 4, atmospheric air rushes into the collapsible chamber through the opening 19, dissipating the vacuum in the collapsible chamber. The collapsible chamber will now expand to its normal position as shown by Figure 1. As long as the valve 32 remains open, it will be obvious that the vacuum created within the pipe line will again collapse the collapsible chamber 6 and the operation will be repeated with the result that the arm 25 will take a swinging motion, which will continue until the valve 32 has been moved to close or cut off communication between the collapsible chamber and intake manifold of the motor.

If the motor vehicle is moved to the right, the valve 32 at the right side of the pipe system will be operated in a like manner, which will cause the indicating arm at the right side and rear right side of the vehicle, to swing, until the valve is turned to cut off communication between the collapsible chambers of the indicators, and the intake manifold of the motor.

In view of the foregoing detail description, it is believed that a further detail description as to the operation of the device is unnecessary.

What is claimed is:

The combination with the intake manifold of a motor vehicle, a direction signal comprising a housing, a pivoted indicator mounted on the housing, a movable member sensitive to the action of a vacuum, mounted in said housing, a pipe establishing communication between the movable member and intake manifold, a normally open valve mounted in the pipe and adapted to control the passage of air through the pipe, means for transmitting movement of the movable member to said pivoted indicator, said means comprising an arm connected with the indicator and a link connected between the movable member and arm, an arm connected with the valve, and a spring connected between the arm on the valve and first mentioned arm, and said spring adapted to move the valve to closed position when the end of the spring connected with the first mentioned arm moves past dead center, and means for then restoring said movable member and valve to normal position.

HOWARD EDWIN FULTZ.